United States Patent [19]

Perkins et al.

[11] Patent Number: 5,438,333

[45] Date of Patent: Aug. 1, 1995

[54] ELECTROMAGNETIC RADIATION ABSORBING SHROUD

[75] Inventors: Robert W. Perkins, Amesbury, Mass.; Todd J. Durant, Kingston, N.H.

[73] Assignee: ARC Technologies, Inc., Amesbury, Mass.

[21] Appl. No.: 282,532

[22] Filed: Jul. 28, 1994

[51] Int. Cl.[6] .......................................... H01Q 17/00
[52] U.S. Cl. .................................................. 342/4
[58] Field of Search ............... 342/4, 1; 343/711, 713, 343/841, 786

[56] References Cited

U.S. PATENT DOCUMENTS

| | | |
|---|---|---|
| 2,415,807 | 2/1947 | Barrow et al. ................ 343/777 |
| 2,474,384 | 6/1949 | Sunstein . |
| 2,599,944 | 6/1952 | Salisbury . |
| 3,078,461 | 2/1963 | Dwyer ............................ 343/907 |
| 4,049,939 | 9/1977 | Katona . |
| 4,050,073 | 9/1977 | Wesch . |
| 4,189,730 | 2/1980 | Murdock ......................... 343/841 |
| 4,293,859 | 10/1981 | Sergent . |
| 4,353,069 | 10/1982 | Handel et al. .................... 342/1 |
| 4,788,554 | 11/1988 | Smith ............................. 343/786 |
| 4,831,210 | 5/1989 | Larson et al. . |
| 4,901,080 | 2/1990 | McHenry . |
| 4,906,998 | 3/1990 | Shibuya ............................ 342/4 |
| 5,056,817 | 10/1991 | Fuller ............................. 280/770 |
| 5,335,366 | 8/1994 | Daniels ............................ 455/89 |

FOREIGN PATENT DOCUMENTS

22711/35  6/1936  Australia .
747558  11/1966  Canada .

OTHER PUBLICATIONS

Emerson & Cuming, Inc. Short Form Catalog Eccosorb—Microwave Absorbers: Electronic 5, Nov. 1, 1957.
Special Microwave Absorbers: McMillan.
B. F. Goodrich: Microwave Absorbers.

Primary Examiner—Stephen C. Bentley
Assistant Examiner—Christopher K. Montgomery
Attorney, Agent, or Firm—Michael A. Centanni

[57] ABSTRACT

A radar absorbing apparatus for use with an electromagnetic radiation generating device is disclosed. The radar absorbing apparatus comprises a rigid housing having a closed end and an open end defining an inner cavity. The open end is formed to have a peripheral edge dimensioned to mate to the interior surface of a motor vehicle window. The housing has electromagnetically reflective properties. In addition, the housing has an aperture that extends through the closed end of the housing that communicates with the cavity. This aperture is dimensioned to receive an operative end of the electromagnetic radiation generating device. The apparatus further includes an electromagnetically absorbing layer that is disposed on the inner surface of the housing.

23 Claims, 4 Drawing Sheets

ELECTROMAGNETIC RADIATION ABSORBING SHROUD

FIELD OF THE INVENTION

This invention relates to devices that absorb electromagnetic radiation. More particularly, this invention relates to an electromagnetically reflective and absorptive shroud for use in connection with a police radar gun.

BACKGROUND OF THE INVENTION

Radar technology has been used in the past to measure the speed of moving objects. In recent years, radar technology has been used by the police to measure the speed of moving vehicles.

For years, it has been suspected by the scientific and medical communities that exposure to electromagnetic radiation may result in various forms of cancer in humans. Even exposure to low levels of electromagnetic radiation is suspect in the initiation of leukemia in humans.

The radar guns typically used by police to detect the speed of vehicles radiate electromagnetic radiation at a specific frequency. The emitted radiation is directed toward a moving vehicle. The emitted radiation reflects from the moving vehicle and is detected by the radar gun. An appropriate electronic circuitry performs an analysis (e.g., a Doppler shift calculation) on the return signal and the speed of the moving vehicle is determined and displayed.

Police radar guns may be used inside or outside of the police vehicles. They may be affixed to the windshield of the police vehicle or hand held. If used inside of the police vehicles, the electromagnetic beam is directed at a moving vehicle through the windshield or other window of the vehicle.

It is well accepted that electromagnetic waves will be partially reflected at an interface where an impedance mismatch exists. Such an impedance mismatch exists at an air-glass interface. Consequently, a portion of the electromagnetic radiation incident on the inner surface of the windshield, or other glass window if the radar gun is so aimed, will be reflected back into the vehicle.

Continual exposure to such reflected radiation may result in the onset of cancer. In fact, there have been occurrences of cancer, in particular testicular cancer, in some policemen where the exposure to the above identified reflected electromagnetic radiation is suspect. Moreover, some states have banned the use of radar guns in an effort to protect their policemen from exposure to potentially cancer causing electromagnetic radiation.

A further, and perhaps more serious problem, is realized in the case of hand held radar guns. Typically the operator holds the radar gun at arms length to get a reading on a suspected speeding vehicle. Upon confirming a speed limit infraction, the operator either places the gun between his legs or on the seat next to him, so as to facilitate pursuing the speeding vehicle. In the case of placing the hand held radar gun between his legs, the operator will be exposed to nearly 100% of the emitted radiation of the radar gun. In the case of laying the radar gun down on the seat, the radar gun would typically face the interior of the passenger door. The passenger door is usually constructed of metal which would reflect nearly 100% of the incident radiation back toward the operator.

The present invention overcomes these and other problems, and provides an apparatus for shielding electromagnetic radiation from a radar emitting source. Potentially damaging electromagnetic radiation may be contained and attenuated, protecting the operator from unnecessary exposure to such possibly cancer provoking electromagnetic radiation.

SUMMARY OF THE INVENTION

It is an object of this invention to provide an apparatus that contains, absorbs and attenuates radar beams, produced by a radar emitting device.

It is a further object of the present invention to provide an apparatus, as described above, that absorbs electromagnetic radiation that has been reflected from an air/glass interface.

It is a further object of this invention to provide an apparatus or protective shroud, as described above, that contains, absorbs and attenuates radar beams produced by police hand held radar guns.

It is a further object of the present invention to provide an apparatus, as described above, comprised of a rigid radar reflecting shell having a layer of radar absorbing foam attached thereto.

It is a further object of this invention to provide an apparatus, as described above, wherein the device comprises a shroud thermoformed from plastic, coated on the interior walls with an electrically conductive material, the electrically conductive material coated with a carbon containing foam.

It is a further object of the present invention to provide an apparatus, as described above, wherein the device is attached to the windshield or another window inside a police vehicle.

It is a further object of this invention to provide an apparatus, as described above, which includes means for affixing the housing to a windshield such that minimal reflected radiation leaks from between the windshield and the end of the apparatus.

It is a further object of this invention that said metal coating be at least about as thick as the skin depth as determined, in part, by the frequency of the incident radar beam, more preferably at least about as thick as ten times the skin depth and most preferably at least about as thick as twenty times the skin depth.

It is a further object of the present invention to provide a protective apparatus, as described above, wherein the shroud comprises a truncated shape with a circular, elliptical or prismatic cross-section such that the shroud may or may not diverge as one moves from the radar gun toward the windshield.

It is a further object of the present invention to provide a protective apparatus, as described herein, such that the truncated shape allows for an eight to ten degree movement of the radar beam within the protective apparatus so that the radar beam may propagate through the windshield or another window unhindered by the protective apparatus.

It is a further object of this invention that the thermoformed protective shroud be comprised of a polymeric material loaded with sufficient metallic, or metallically coated particles to impart sufficient electromagnetic reflective properties to said polymeric material such that the protective shroud reflects a substantial percentage of the radar beam incident thereon.

It is a further object of this invention to provide an apparatus, as described above, wherein said housing is formed of a polymeric matrix having a loading of metallic or metallically coated particles at least equal to or greater than the percolation threshold.

It is a further object of this invention to provide an apparatus, as described above, wherein the insertion loss of the housing is from about −10 to about −100 dB, more preferably from about −15 to about −80 dB, most preferably from about −20 to about −60 dB.

It is a further object of this invention that the polymeric material be comprised of acrylonitrile-butadiene-styrene ("ABS") copolymer.

It is a further object of this invention that the shroud be four sided pyramidal in shape wherein the large cross-sectional area of the pyramid is affixed to the windshield or other window within the police vehicle; and, the small cross-sectional area of the pyramid be supported by the radar gun.

DETAILED DESCRIPTION OF THE DRAWINGS

The invention may take physical form in certain parts and arrangements of parts, embodiments of which will be described in detail in the specification and illustrated in the accompanying drawings wherein.

FIG, 3A is an enlarged sectional view of area 3A in FIG. 1 showing the laminar structure of the apparatus shown in FIG. 1.

DETAILED DESCRIPTION OF THE PREFERRED EMBODIMENT OF THE INVENTION

Referring now to the drawings wherein the purpose is the showing of a preferred embodiment of the present invention only and not for the purpose of limiting the same, FIGS. 1–4C illustrate an apparatus 10 for absorbing electromagnetic radiation from a radar emitting device illustrating a preferred embodiment of the present invention.

Figure 1:
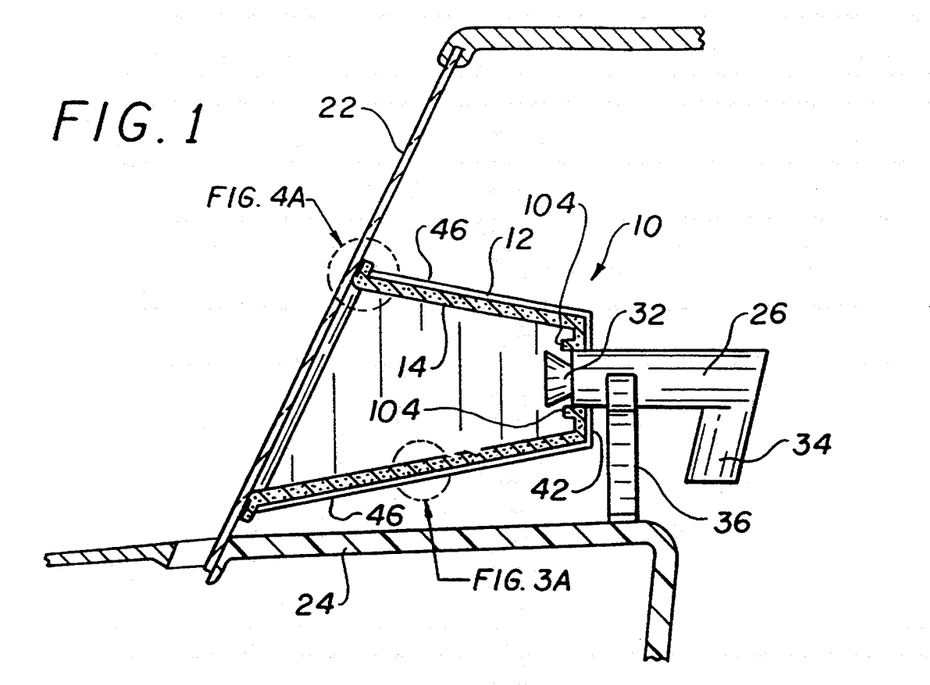
FIG. 1 shows an apparatus for absorbing electromagnetic radiation illustrating a preferred embodiment of the present invention and showing the apparatus enclosing the emitting end of a radar gun and attached to the windshield of a vehicle.

Broadly stated, apparatus 10 is comprised of an electromagnetic radiation reflecting housing or shroud 12 and a layer 14 of an electromagnetic absorbing material disposed along the inner surface thereof. In the embodiment shown in FIGS. 1–4C, apparatus 10 is adapted for mounting within a vehicle. For the purpose of illustration, FIG. 1 schematically shows a windshield 22 and a dashboard 24 of a conventional automotive vehicle. A radar gun 26 is schematically illustrated and includes a radar emitting end 32 and a pistol grip end 34, the pistol grip being optional on internally mounted radar guns, for operation by the user. Radar gun 26 is typically mounted to dashboard 24 by means of a bracket 36 which positions radar gun 26 with radar emitting end 32 directed toward windshield 22. Bracket 36 generally permits adjustment of the position of radar gun 26 relative to windshield 22.

Figure 2:
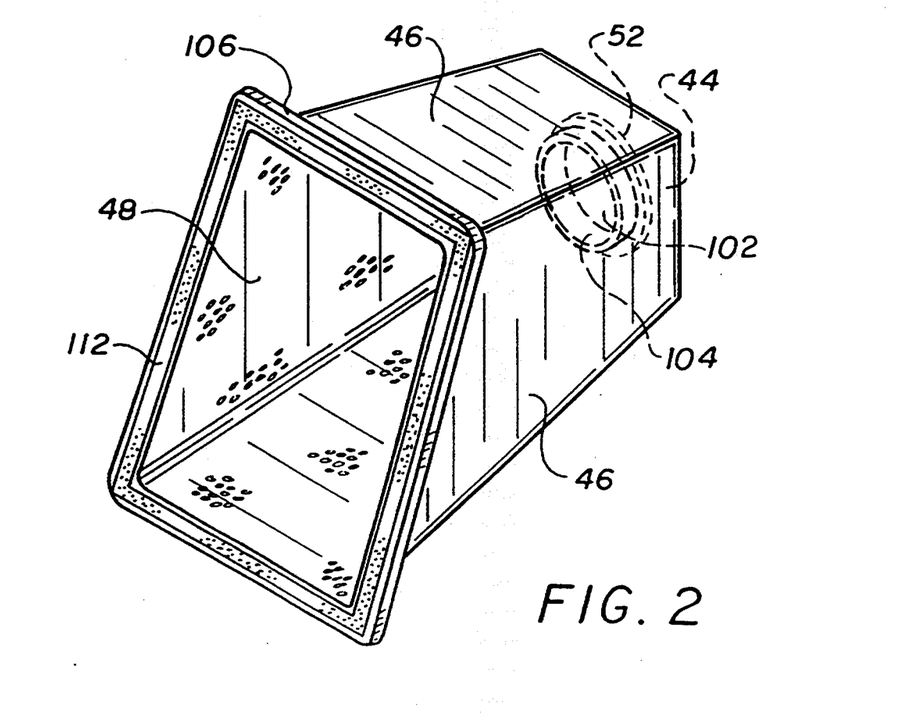
FIG. 2 is a perspective view of the apparatus shown in FIG.

Apparatus 10 is adapted to enclose radar emitting end 32 of gun 26 and to be positioned against windshield 22. In the embodiment shown, apparatus 10 is formed to have a truncated, generally pyramidal shape. The shape of apparatus 10 is generally defined by an electromagnetically reflective housing or shroud 12. As best seen in FIG. 2, housing 12 includes a generally flat end wall 42 which defines a closed end 44 and four side walls 46 which diverge outwardly from end wall 42 and terminate to define an open end 48. Open end 48 is formed to conform to the inner surface contour of windshield 22 so as to enable apparatus 10 to be snugly positioned thereagainst. An opening 52 is formed in end wall 42 of shroud 12 to facilitate insertion of radar emitting end 32 of gun within apparatus 10.

Shroud 12 is preferably formed as an integral unit and has predetermined radar reflecting characteristics. According to the present invention, shroud 12 has a minimum electromagnetic shielding effectiveness of at least about −15 dB.

As will be appreciated, shroud or housing 12 may be formed from a wide range of materials. According to the present invention, shroud 12 is preferably formed of a combination of plastic and metal.

Figure 3A:
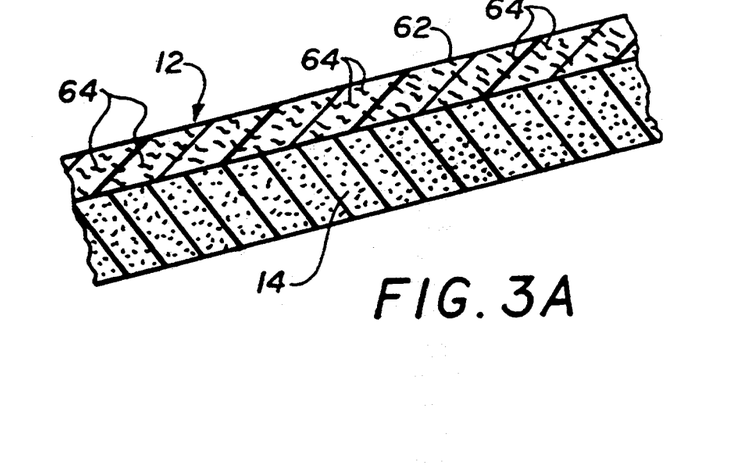
Figure 3B:
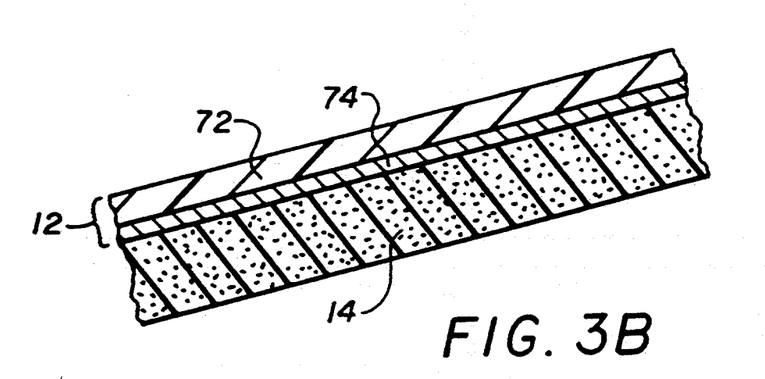
FIG. 3B is an enlarged sectional view showing an alternate laminar structure for forming the apparatus shown in FIG. 1.
Figure 3C:
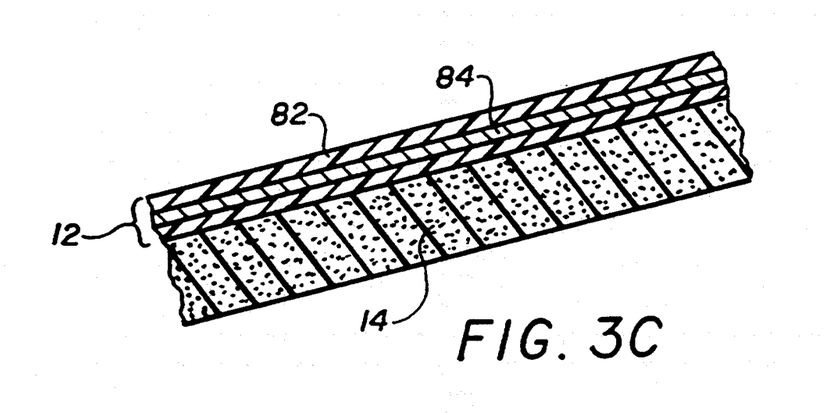
FIG. 3C is an enlarged sectional view showing an alternate laminar structure for forming the apparatus shown in FIG. 1.

FIGS. 3A, 3B, and 3C show three preferred compositional embodiments of shroud 12. In the embodiment shown in FIG. 3A, shroud 12 is formed of a layer 62 of a thermoformed polymeric material having metal particles or fibers 64 embedded therein. In accordance with the present invention, electromagnetically reflective shroud 12 is preferably formed via an internal concentration of metallic particles and/or fibers 64 forming an electrically reflective network within the polymeric layer 62. Layer 62 may be formed of any rigid, tough polymer such as polyethylene, polypropylene polymethylmethacrylate, polystyrene, thermosets, such as epoxies, urethanes and other thermosets know in the industry and engineering thermoplastics Acrylonitrile-butadiene-styrene ("ABS") has been proven to be an acceptable polymeric material. Metal particles 64 may be irregularly shaped metallic particles, metallic spheres, metallic fibers, metallic flakes, metallic coated irregularly shaped particles, metallic coated spheres, metallic coated fibers or combinations thereof. In a preferred embodiment, shroud 12 is thermoformed from a polymeric material that contains stainless steel fibers. The polymeric material may contain a concentration of stainless steel fibers equal to or greater than the percolation threshold. The loading level of the stainless steel fibers should also be sufficient to result in from about a −10 dB to about a −100 dB insertion loss, more preferably from about a −15 dB to about an −80 dB insertion loss and, most preferably from about a −20 dB to about a −60 dB insertion loss.

The percolation threshold of shroud 12 depends on the aspect ratio (the ratio of the largest dimension to the smallest dimension) of electrically conductive filler particles 64 loaded into the polymeric material layer 62 forming shroud 12. It is believed that the percolation threshold depends on the square of the aspect ratio of electrically conductive filler particles 64. It is believed that the larger the aspect ratio of electrically conductive filler particles 64, the more efficient shroud 12 will reflect electromagnetic radiation. That is, to obtain a given insertion loss value for a high aspect ratio filler, a lower density of electrically conductive filler particles 64 may be used. An aspect ratio of greater than about five to one is preferable, of greater than about ten to one more preferable and of greater than about twenty to one most preferable.

According to the present invention, particles 64 may be formed of other materials. Without limitation, other examples may include silver coated glass spheres or fibers, copper coated glass spheres or fibers, nickel coated glass spheres or fibers or mixtures thereof, such mixtures including mixtures with stainless steel fibers.

Conventional thermoforming or injection molding techniques are preferably employed, wherein heat and vacuum techniques are used to form the stainless steel loaded polymer into the final shape of protective shroud 12.

In the embodiment shown in FIG. 3B, an alternate structure of shroud 12 is shown. In this embodiment, shroud 12 is generally comprised of a layer 72 of a polymeric material having an inner layer 74 of metal attached thereto. Polymeric layer 72 of shroud 12 is preferably formed by conventional thermoforming techniques and may be comprised of a rigid, tough polymer material such as those described above, and specifically acrylonitrile-butadiene-styrene ("ABS"). Metal layer 74 may be a preformed metal foil or sheet made of copper, aluminum, steel, brass or nickel. Furthermore, metal layer 74 may be applied by chemical vapor deposition, sputtering techniques, autocatalytic techniques or zinc arc spraying techniques. As will be appreciated, in this embodiment, it is the metal layer 74 that provides the electromagnetic reflecting characteristics of shroud 12. The thickness of the metallic layer is chosen to result in at least about a −15 dB shielding effectiveness. If better reflecting properties are desired, a thicker metallic layer may be used.

Housing 12 may also be formed of or lined with intrinsically, electrically conductive polymers such as pristine or doped polyacetylene.

Referring now to FIG. 3C, a still further embodiment of shroud or housing 12 is shown. In this embodiment, shroud 12 is basically formed of a layer 82 of a polymeric material of the type as previously described having a sheet or layer 84 of metal embedded therein. Sheet 84 may be formed of any of the metallic materials described above and having a thickness suitable to provide the reflective properties described above. According to the present invention, housing 12 provides a minimum shielding level of at least about −15 dB.

Referring now to FIGS. 1 and 2, electromagnetically absorbing layer 14 is best seen. As indicated above, electromagnetically absorbing layer 14 is provided along the entire inner surface of shroud 12. At the closed end of shroud 12, an aperture 102 is formed through the electromagnetically absorbing layer 14 to receive the radar emitting end 32 of the radar gun. Importantly, opening 102 in the electromagnetically absorbing layer 14 is smaller in diameter than opening 52 in the shroud 12, wherein an annular ring or lip 104 of radar absorbing material extends within the circumference of opening 52. At open end 48 of housing 12, electromagnetically absorbing layer 14 is preferably formed to include an outwardly extending flange 06 which projects beyond the periphery of housing 12.

According to the present invention, electromagnetically absorbing layer 14 is formed of a resilient, compressible foam composition having radiation absorbing characteristics in the operative frequency ranges of radar guns and/or microwave devices. In this respect, police radar guns typically operate in the X-band microwave frequency range. Accordingly, an electromagnetically absorbing layer 14 preferably exhibits a minimum insertion loss of −20 dB in the X-band microwave frequency range which is the lowest frequency currently used in police radar guns.

In accordance with the present invention, electromagnetically absorbing layer 14 is formed of carbonaceous or graphitic (collectively or separately called carbon or carbonaceous) materials dispersed throughout a flexible foam. For example, the graphite particles of the radar absorbing foam may take the form of pyrolyzed polyacrylonitrile ("PAN") or pitch based graphite particles, or other electrically conductive carbon black particles. Intercalated, pitch based graphite particles may also be used as the active component of the carbon loaded foam. Pitch based graphite is a semimetal. That is, its electrical conductivity in the graphitic planes is semi-metallic. The electrical mobility in the graphitic planes is large for pitch based graphite; however, there is a paucity of charge carriers available for conduction in the graphitic planes resulting in a semimetallic conductivity. Pitch based graphite particles may be intercalated by, for example, molecular bromine. The molecular bromine donates holes to the graphitic planes providing for an increase in the charge carrier density. The increased number of charge carriers may then take advantage of the high charge mobility in the graphitic planes resulting in an increase in the electrical conductivity of the pitch based graphite. In some cases, the electrical conductivity of the intercalated, pitched based graphite particles may increase by a factor of five over the electrical conductivity of the pristine pitch based graphite particles, i.e., pitch based particles that have not been intercalated. The use of intercalants (the chemical added to the pitch based graphite particles—in this case the molecular bromine) other than molecular bromine is contemplated.

The electromagnetic absorbing properties of the foam are such that in conjunction with the electromagnetic reflective properties of shroud 12, a minimum shielding effectiveness of at least about −40 dB is achieved.

Figure 4A:
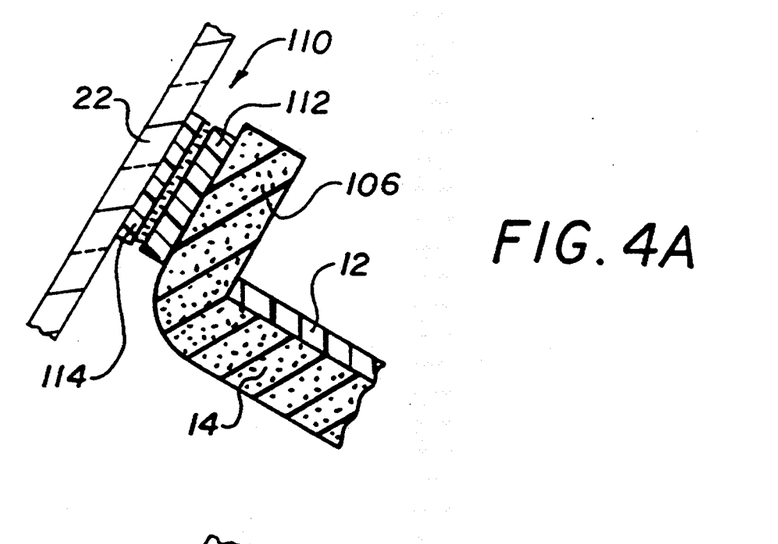
FIG. 4A is an enlarged, sectional view of area 4A of FIG. 1 showing a preferred means of attaching the radar absorbing apparatus to a conventional windshield of a vehicle.
Figure 4B:
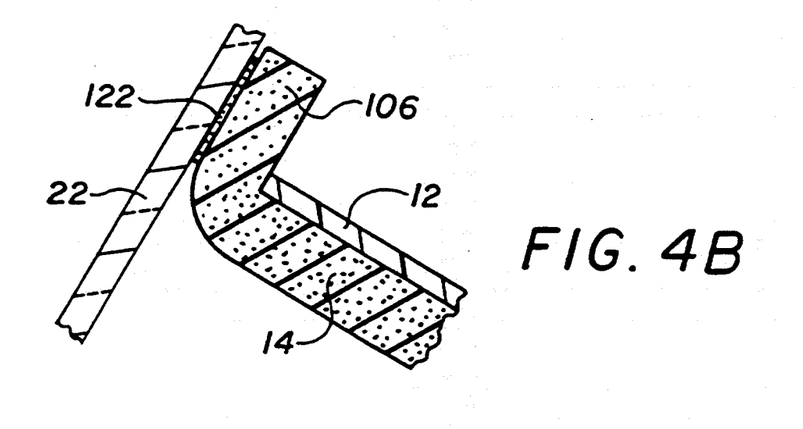
FIG. 4B is an enlarged, sectional view showing an alternate means for attaching the radar absorbing apparatus to a conventional windshield of a vehicle.
Figure 4C:
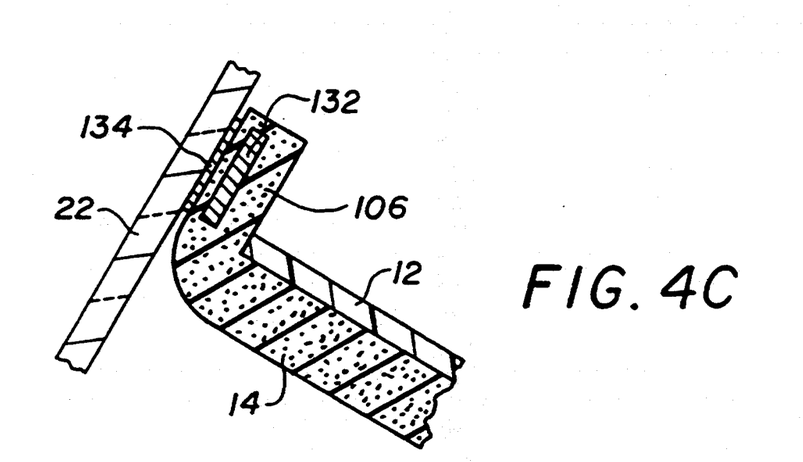
FIG. 4C is an enlarged, sectional view showing an alternate means for attaching the radar absorbing apparatus to a conventional windshield of a vehicle.

According to one aspect of the present invention, to ensure a complete seal against windshield 22, means are provided to position apparatus 10 to windshield 22. FIGS. 4A, 4B and 4C illustrate several methods of securing apparatus 10 to a windshield.

In the embodiment shown in FIG. 4A, shroud 12 is attached to windshield 22 of a vehicle by hook and loop attachment means 110, such as VELCRO ®, which is a registered trademark of Velcro USA, Inc. Such material is typically comprised of mating strips 112, 114, wherein one strip includes hook means and the other includes loop means. Strip 112 is attached to outward facing surface of flange 106. Strip 112 is preferably attached to flange 106 of radar absorbing layer 14 with an adhesive material such as a heat stable pressure sensitive adhesive. Strip 114 is provided for attachment to windshield 22, as shown in FIG. 4A. Strip 114 is also preferably attached to windshield 22 by a heat stable pressure sensitive adhesive or other adhesive materials. Preferably, hook and loop attachment strips 112, 114 are initially locked together and mounted to flange 106 as described above. The pressure sensitive adhesive on strip 114 is covered by a protective paper. The protective paper on strip 114 may be peeled away exposing the heat stable pressure sensitive adhesive when apparatus 10 is to be mounted to windshield 22. This exposed adhesive will ultimately be adhered to the inner surface of windshield 22.

It will be further appreciated that the hook and loop attachment means may be coated with or constructed out of metal thereby providing a electromagnetically reflective attachment means. This would assist in retaining any radiation that is reflected from the inner surface of the windshield 22.

The exposed pressure sensitive adhesive side of strip 114 on flange 106 is now pushed and seated against the inner surface of windshield 22 of the vehicle. For purposes of this invention, it does not matter whether the hook or loop attachment means is attached to the windshield 22. The radar gun is clamped to the support means 35 as illustrated in FIG. 1.

FIG. 4B shows an alternate method of attaching apparatus 10 to the inner surface of windshield 22. In this method, a double sided adhesive tape 122 having a heat stable pressure sensitive adhesive on both sides is attached directly to flange 106 of radar absorbing layer 14. A removable, protective paper layer (not shown) may cover the side of tape 122 intended for attachment to inner surface of window 22, which protective paper layer may be removed when apparatus 10 is to be attached to inner surface of windshield 22.

It will be appreciated that the pressure sensitive adhesive used has sufficient heat stability such that typical temperatures attained at the inner surface of the windshield 22 during hot summer months do not weaken the bond strength of the pressure sensitive adhesive.

FIG. 4C shows an another alternate means for attaching apparatus 10 to windshield 22. In this instance, a conventionally known flexible, ferromagnetic strip 132 is embedded within flange 106 of radar absorbing foam layer 14. Such ferromagnetically active materials include nickel, iron and cobalt. A ferromagnetically active material 134, is attached to the inner surface of windshield 22 with a heat stable pressure sensitive adhesive or other adhesive means. In this respect, apparatus 10 is positioned relative to the inner surface of windshield 22, embedded magnetic strip 132 is attracted to magnetically active tape 134, attached to windshield 22, providing an attachment means for apparatus 10. It is understood that either or both ferromagnetically active materials 132, 134 are magnetized. The magnetic force that exists between the two ferromagnetically active materials 132, 134 provides the attachment means between the embedded ferromagnetically active material 132 and the ferromagnetically active material 134 adhered to windshield 22. It is understood that other magnetic materials such as ferrimagnetic materials are also contemplated as appropriate attachment means.

As indicated above, it is understood that open end 48 of shroud 12 mates with the inner surface of windshield 22. To this end, open end 48 of shroud 12 is preferably found to conform closely to the inner contour of windshield 22 prior to applying foam layer 14 thereto. A conventional band saw may be used to form open end 48 of the radar reflecting shroud 12 so that it conforms to the inner surface of windshield 22. Any gaps formed as a result of irregularities on the inner surface of the windshield or the open end 48 of shroud 12 would be filled by the resiliency of the flexible radar absorbing foam forming flange 106 which extends around the edge of shroud 12.

In an alternate embodiment of the present invention, the radar absorbing foam 14 may extend beyond the open end 48 of shroud 12. As the peripheral edge of the radar absorbing apparatus 10 is pushed and seated against windshield 22, the radar absorbing foam would be positioned interior to the shroud and would provide a layer of radar absorbing material between the inner cavity of the housing and the peripheral edge of the housing. The layer of radar absorbing material would absorb electromagnetic radiation that might otherwise escape through any cracks or gaps formed between the peripheral edge of the shroud and windshield 22. The peripheral edge of the shroud may be attached to the windshield by the adhesive attachment means previously disclosed.

Figure 5:
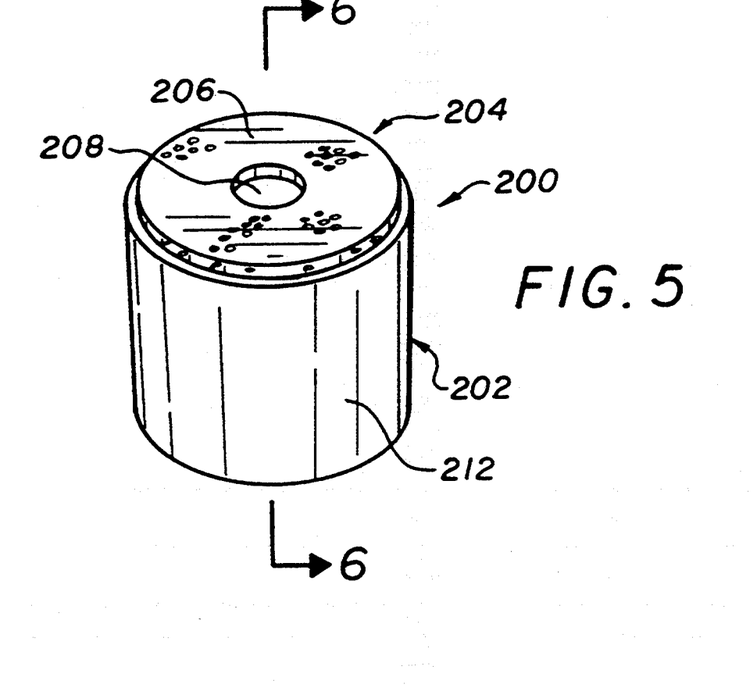
FIG. 5 shows the radar gun holster illustrating another embodiment of the present invention; and, FIG. 6 is a cross-sectional view of the radar gun holster shown in FIG. 5.
Figure 6:
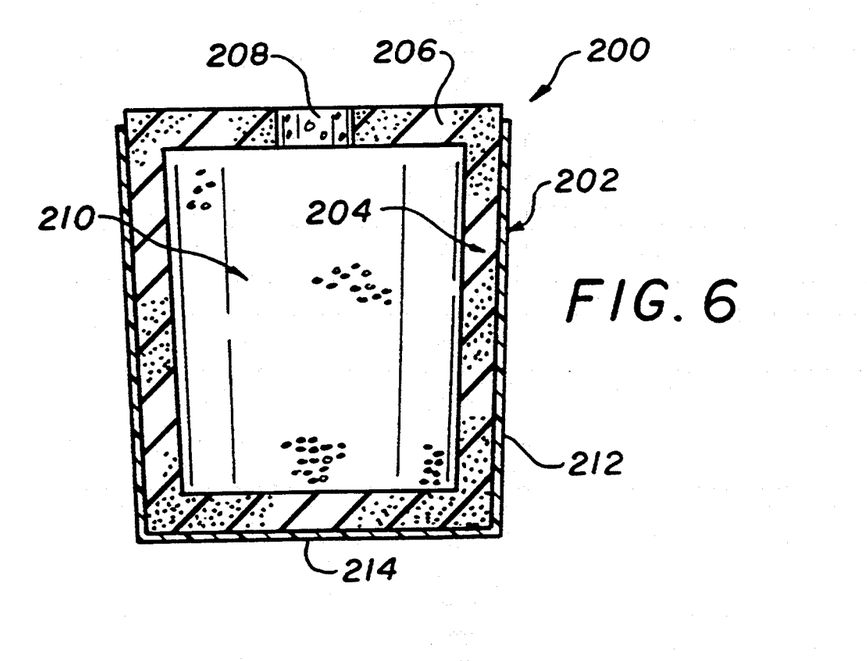

Referring now to FIGS. 5 and 6, an alternate embodiment of the present invention is shown. FIG. 5 shows a radar gun holster 200 for receiving the radar emitting end of a hand held radar gun. Holster 200 is comprised of an outer electromagnetically reflective housing 202 having an electromagnetically absorbing layer 204 disposed on the inner surface thereof. In the embodiment shown, housing 202 is generally cylindrical in shape, and is defined by a cylindrical side wall 212 and a flat circular bottom wall 214. Housing 202 is preferably formed of an electromagnetically reflective material such as aluminum, copper, brass or steel ranging in thickness from about 0.062 inches to about 0.25 inches and more preferably from about 0.07 inches to about 0.175 inches and most preferably from about 0.09 inches to about 0.125 inches. As will be appreciated, housing 202 may be formed of a metal/plastic combination as described above with respect to housing 12.

The electromagnetically absorbing layer 204 is comprised of a radar absorbing foam of the type described above. As best seen in FIG. 6, an electromagnetically absorbing layer 204 covers the entire inner surface of housing 202 and may or may not be formed to include an upper wall portion 206. An aperture 208 is formed in wall portion 206 to communicate with an internal cavity 210 as defined within holster 200 by electromagnetically absorbing layer 204. Aperture 208 is dimensioned to receive the radar emitting end of a hand held radar gun when not in use. The radiation emitting end of the hand held radar gun is directed toward the closed end of housing 202. Any electromagnetic signal reflected from the closed end of housing 202 should be attenuated by at least about −15 dB so as not to electronically damage the radar gun.

Referring now to the operation of radar absorbing apparatus 10, electromagnetic radiation incident upon an interface, wherein there is a discontinuous change in the impedance of the two materials at the interface, will undergo a reflection. This is true of microwave radiation incident upon a glass interface, propagating initially in air. Apparatus 10 is provided to absorb such reflected electromagnetic radiation and protect occupants within a vehicle from same.

Broadly stated, the present invention provides an apparatus 10 that extends from the radiating end of the radar gun to the windshield or other window through which the radar beam is directed.

Apparatus 10 is adapted to be placed between the emitting end 32 of radar gun 26 and window 22—it being understood that "window" refers to the windshield, side window, rear window or any other window of the vehicle—through which the radar beam is directed. With respect to mounting, the radar gun is pushed through the opening 52 formed in end wall 42 of shroud 12 and through opening 102 in electromagnetically absorbing layer 14. Importantly, annular or lip 104 of electromagnetically absorbing layer 14 surrounds and seals against radar emitting end 32 of radar gun 26 to minimize radiation leakage therearound.

A percentage of the radar beam incident upon the air/glass interface will be reflected back into the electromagnetically absorbing cavity formed by apparatus 10. As this reflected beam impinges first upon the carbon or graphite loaded layer 14, the electric field of the radar beam accelerates and moves the charge carriers (electrons or holes) located in the carbonaceous material. It is believed that as these charge carriers scatter from carbon atoms, impurities and phonons (quantized lattice vibrations) located within the carbonaceous material, they lose energy and momentum resulting in a warming of the carbonaceous material. In essence, the incident energy, contained primarily in the electric field of the electromagnetic radiation, is absorbed by the charge carriers of the carbonaceous material followed by a slowing down of the moving charge carriers due to the electrical resistance of the carbonaceous material. As the charge carriers slow down, their kinetic energy is imparted to the carbonaceous material as heat, i.e., Joule heat. This results in a diminution of the electric field of the radar beam that emerges from the electromagnetically absorbing foam.

It is desirable that the carbon containing foam absorbs as much of the incident electromagnetic radiation as possible. To effect a large absorptivity of electromagnetic radiation by the carbon containing foam, it is desirable, although it is believed not an operative necessity of the invention, that the carbon loading be at or above the percolation threshold. At loadings below the percolation threshold, it is believed that the electromagnetic radiation is primarily scattered by the carbon particles (i.e., the carbon particles act as scattering centers) with a small portion of the radiation being absorbed by the carbon particles. At or above the percolation threshold, the carbon particles are sufficiently networked so that the charge carriers that are accelerated by the incident radiation have more room to move. That is, the charge carriers may move throughout the network of carbon particles.

In some cases, there may be small gaps between one strand of chained carbon particles and another strand of chained carbon particles. It is contemplated that at or above the percolation threshold, the loading of carbon particles is sufficiently high such that the interparticle distance from one strand to another, in some cases, may be small enough so that the charge carriers (electrons or holes) may quantum mechanically tunnel from one strand through the intervening polymeric resin to another. Again, this would give the charge carriers more room to move resulting in more absorption of the incident electromagnetic radiation. In essence, it is believed that at or above the percolation threshold, the carbon particles behave as a semi-metallic network, as opposed to individual scattering centers, resulting in a more efficient absorption of the incident electromagnetic radiation.

Some of the radiation incident upon the carbon containing foam will pass through the carbon containing foam. This radiation will impinge upon the electromagnetically reflective layer that surrounds the radar absorbing foam. A significant portion of the electromagnetic radiation incident upon this electromagnetically reflective layer will be reflected. This reflected beam will travel back through the carbon containing foam as it heads back toward the cavity. On the way back toward the cavity, the reflected electromagnetic radiation encounters the carbon containing foam once again, and the carbon containing foam further absorbs some of the electromagnetic radiation. Whatever fraction of radiation that re-enters the cavity will impinge upon another portion of the carbon containing foam and the cycle is repeated. The radar beam will continue to reflect and undergo absorption within the radar absorbing apparatus until its magnitude reduces significantly, or at least to a point to be of no physiological significance should it leak from the shroud and impinge on a radar gun operator.

The performance of the radar absorbing apparatus in reducing the level of harmful electromagnetic radiation in the police vehicle is typically measured in decibels ("dB"). In the case where the electromagnetic radiation is reflected from a window, a measure of the amount of the reflected and trapped radiation that escapes from the radar absorbing apparatus relates to the ability of the apparatus to shield the operator of the gun from exposure to the reflected and trapped radiation. In essence, the radar beam is directed to a window and some of the energy reflects from the air/glass interface. This reflected energy is trapped within the protective apparatus. The percentage of the trapped radiation that leaks from the protective apparatus is a measure of the performance capabilities of the protective apparatus. The formula used to calculate the shielding effectiveness in decibels is:

$$\text{shielding effectiveness in dB} = 10 \log (P/P^*);$$

where, $P^*$ is the power of the radiation incident on the interior surface of the protective apparatus and P is the power of the radiation that escapes from the protective apparatus. The shielding effectiveness, sometimes called the insertion loss, is typically negative as $P^*$ is usually greater than P. The following table illustrates the decibel designation.

TABLE I

| SHIELDING IN dB | PERCENTAGE OF POWER TRANSMITTED |
|---|---|
| −10 | 10% |
| −20 | 1% |
| −30 | 0.1% |
| −40 | 0.01% |
| −50 | 0.001% |

Note that an insertion loss of −50 dB equals one-one thousandth of one percent of the incident power. So, a dB reading of −50 means that only one-one thousandth of one percent of the power incident on the interior of the radar absorbing apparatus was transmitted or leaked through the radar protective apparatus.

Electromagnetic radiation is comprised of an oscillating electric field and an oscillating magnetic field. The two fields oscillate in mutually perpendicular directions such that the vector cross-product of the electric field vector with the magnetic field vector points in the direction of the propagation of the energy of the electromagnetic radiation (the resultant vector is called the Poynting vector). In the far field, the ratio of the magnitude of the electric field intensity of the radiation to the magnetic field intensity is a constant. In fact, this ratio is the impedance of the material through which the radiation is traveling. If the magnitude of the electric field intensity and the magnetic field intensity of the radiation could be determined in the material in which the radiation is propagating, the ratio of the two field strengths (E/H) would equal the impedance of the material.

The radiation incident upon the interior wall or walls of the shroud is most likely in the far field. As an example, the wavelength of the radar beam may be 1.24 cm. The radiation incident upon the interior wall or walls of the protective apparatus would be in the far field if the distance from the point in question to the radiation source is greater than the wavelength of the radiation divided by $2\pi$. If the wavelength of the radar beam is 1.24 cm, this ratio is about 0.2 cm or 2 mm. If we view the surface of the glass, from which the incident radar beam is reflected, as the source of the trapped radiation, the reflected, and hence trapped radiation will be in the far field.

In the far field, the electric field dominates and so the reflective and absorptive properties of the protective apparatus should be a function of the manner in which the electric field of the radiation interacts with the reflective and absorptive components of the protective apparatus. Metals, with their excellent electrical conductivity, reflect electromagnetic radiation. The free electrons of the metals are accelerated by the electric field component of the incident electromagnetic radiation causing the electrons to re-radiate.

The ability of the metal surface to reflect electromagnetic radiation depends on the skin depth. The skin depth depends on the nature of the material, i.e., the type of metal that comprises the electromagnetically reflective material and the frequency of the incident radiation. It is believed that if the thickness of the metal is less than the skin depth, as determined in part by the incident radiation's frequency, then little of the incident electromagnetic radiation will be reflected by the metallic material. The following Table II gives examples of the depth of penetration of electromagnetic radiation at 24.12 GHz for a variety of metals (see *American Institute of Physics Handbook*, Third Edition, McGraw-Hill, Inc., p. 5–105, 1972). The "E" represents the power of ten. For example, 4.12 E−7 represents 4.12 times ten to the negative seven power, or 0.000000412

TABLE II

| METAL | PENETRATION DEPTH IN METERS AT 24.12 GHz |
|---|---|
| Silver | 4.12 E-7 |
| Copper | 4.25 E-7 |
| Aluminum | 5.47 E-7 |
| Chromium | 5.21 E-7 |
| Nickel | 9.01 E-8 |

It will be appreciated that if the thickness of the metallic layer is less than the distance to which the radiation will penetrate the metallic layer, some of the incident radiation will pass through the metallic layer. Such leakage of electromagnetic radiation through the metallic layer is undesirable as whatever radiation leaks from the protective apparatus is no longer trapped by the apparatus and may impinge on the radar gun operators. Therefore, the thickness of the metallic surface layer should be at least about one skin depth, more preferably at least about ten times the skin depth and most preferably at least about twenty times the skin depth.

As a radar beam is directed to a window, the majority of the energy will propagate through the glass window; will travel at nearly the speed of light; will impinge upon the moving vehicle; will return to the radar gun wherein an analysis on this return signal is electronically performed and the speed of the moving vehicle is electronically displayed for observation by the radar gun operator. The intensity of the radar beam returned from the target vehicle is small and of little physiological consequence.

The data in the following Table III are power measurements made in vehicles. These power measurements are made with no protective apparatus in place. With the protective apparatus of the present invention in place, the power levels are equal to or less than the sensitivity of the measuring device, i.e., −52 dbm. These data are obtained within a vehicle using an MPH Industries' No. K55 Doppler Radar horn. Both X band and a K sub A band measurements are made. Signal strength measurements are made with a microwave spectrum analyzer.

TABLE III

| POWER LEVELS WITH NO PROTECTIVE APPARATUS IN PLACE | |
|---|---|
| POSITION OF DETECTOR | SIGNAL STRENGTH |
| X BAND HORN | |
| ONE FOOT FROM BACK OF RADAR GUN (INTERIOR OF VEHICLE) | −41 dbm |
| DRIVER'S HEAD | −42 dbm |
| PASSENGER'S HEAD | −46 dbm |
| K SUB A BAND | |
| TWO FEET FROM BACK OF RADAR GUN (INTERIOR OF VEHICLE) | −34 dbm |
| DRIVER'S HEAD | −39 dbm |
| PASSENGER'S HEAD | −34 dbm |

In all cases, with the radar absorbing apparatus placed in between the radiating end of the radar gun and the windshield, the measurements of the radiation levels at the points given in TABLE III are equivalent to or less than the level of noise detectable by the electronics used to measure the radiation levels. This noise level is −52 dbm. So, it may be said that the protective apparatus reduces the radiation levels to at least −52 dbm if not more. Thus, less than one-one thousandth of one percent of the reflected and trapped radiation escapes from the protective apparatus (see Table I).

Further measurements are made inside an anechoic chamber. A radar gun with and without the radar absorbing apparatus is tested. A windshield is mounted in the chamber and the radar gun is aimed through the center of the windshield. A large sheet of aluminum is laid in front of the windshield to simulate a car hood. A Narda 639 X-Band antenna is placed behind the radar gun and at an angle of approximately 30 degrees off of the center line of the barrel of the radar gun. This position is found to provide the highest relative emission level behind the radar gun and corresponds approximately to the location of an operator's head in the driver's seat or a passenger's head in the passenger's seat (the highest peak levels occurred at approximately the same angular locations to either side of the center line of the radar gun). An HP8566B Spectrum Analyzer is used to measure the electromagnetic emissions at a frequency of approximately 10.54 GHz. A general purpose lab supply is used to power the radar gun. DC power to the radar gun is approximately 12.7 volts. The DC supply current to the radar gun is approximately 0.7 amps.

All measurements are relative measurements. That is, absolute measurements should not be compared from one set of measurements to another due to physical changes in the test setup that occur when attaching the various shielding devices. The spectrum analyzer settings are:

center frequency: 10.538 GHz;
frequency span: 10 MHz;
video bandwidth: 3 kHz; and,
resolution bandwidth: 30 kHz.

The measurements relating to the radar absorbing, protective apparatus are as follows:

| | |
|---|---|
| WITHOUT THE RADAR ABSORBING APPARATUS | −37.2 dbm |
| WITH THE RADAR ABSORBING APPARATUS | −52.4 dbm. |

This represents a difference of 15.2 dbm. A 15.2 dbm reduction in the radiated power level corresponds to a 97 percent reduction, at the point of measurement, of the power reflected from the windshield.

A further test of the effectiveness of the protective apparatus involves measuring the radiation levels with the radar gun 0.5 feet from the windshield and the detector 2 feet from the windshield, directly behind the radar gun. In these cases, the radiation power level without the protective apparatus is 35 dbm; with the protective apparatus in place, the radiation power level is −65 dbm. Note that with no protective apparatus in place, the power reflected from the windshield is −35 dbm. This represents a reflected power of about 0.03%. With the protective apparatus in place, the measured power is −65 dbm. Thus, with the protective apparatus in place, about 3 E−5% (or 0.00005%) of the radiation reflected from the window is detected at the location of the detector.

In another application of the present invention, a radar gun holster is constructed of an open ended can made of drawn metal such as very thin aluminum, brass, copper or steel. The interior of this metallic can is coated with the radar absorbing foam. A hole is positioned in the middle of the foam. The diameter of the hole is slightly less than the diameter of the radar gun to effect a tight fit.

The hand held radar gun is inserted into the hole of the holster such that the radiation emanating from the gun is directed toward the closed end of the can or housing. Note that perfect alignment of the barrel of the gun with the axis of the holster is not essential for effective operation of the holster. As previously explained in the discussion of the operation of the radar absorbing apparatus, the emitted radiation is absorbed and reflected within the holster providing protection to the radar gun operator from physiologically harmful exposure to electromagnetic radiation.

The radar gun holster is specifically made for a hand held radar gun. The holster is designed to contain 99% of the energy that the hand held radar gun is emitting when not in use.

The construction of the radar gun holster varies from the window radar absorbing apparatus in that the end to which the gun is directed when positioned in the holster is completely closed and electrically continuous with the rest of the housing. Radar absorbing foam is deposited on the entire inner surface of the housing. The electromagnetically reflective and absorptive layers of the radar gun holster are used in combination such that the electromagnetic radiation reflected from the closed end of the radar gun holster is attenuated by at least about −15 dB. This ensures that no destructive levels of radiation reflect back into the gun transmitter. The radar gun holster will resemble an open-ended can lined with radar absorbing foam.

A measurement of the shielding effectiveness of the radar gun holster is made. The measurement is made to simulate the case wherein the gun rests in the lap of the operator and the emitted radiation is directed to and backscatters from a passenger door.

In this instance, a Narda 639 X-Band antenna and a HP8566B Spectrum Analyzer are used to obtain the measured values. The DC power to the radar gun is 12.7 Volts and the DC current to the radar gun is approximately 0.7 amps. The spectrum analyzer settings are:

center frequency: 10.538 GHz;
frequency span: 10 MHz;
video bandwidth: 3 kHz; and,
resolution bandwidth: 30 kHz.

The measurements are as follows:
WITHOUT THE HOLSTER: −14.7 dbm
WITH THE HOLSTER: −80.5 dbm.

The 65.8 dbm reduction in radiated power levels corresponds to a 99.99997 percent decrease in the residual power level at the point of measurement.

The radar gun holster may be attached to the front surface of the bottom seat cushion with an adjustable strap and hook arrangement to facilitate easy insertion and withdrawal of the radar gun.

This invention provides cost effective structures that significantly reduce the electromagnetic radiation levels to which operators of radar emitting devices are exposed either directly or through reflected signals. Hence, these structures are constructed to minimize exposure to possibly cancer provoking electromagnetic radiation while using radar emitting sources.

The foregoing and other modifications will occur to others upon a reading and understanding of the specification. It is intended that all such modifications, alterations and applications be included insofar as they come within the scope of the patent as claimed or the equivalents thereof.

Having thus described the invention, the following is claimed:

1. A radar absorbing apparatus for absorbing radiation emitted from an electromagnetic radiation generating device, said apparatus comprising:
a rigid housing having a closed end and an open end defining an inner cavity and an inner surface of said housing, said open end formed to have a peripheral edge dimensioned to mate to an interior surface of a vehicle's window, said housing formed of a polymeric material having metallic particulates dispersed therein at a concentration equal to or greater than a percolation threshold, said housing having electromagnetically reflective properties of at least −15 dB; and, an electromagnetically absorbing foam layer disposed on the inner surface of said housing, wherein said layer is comprised of carbonaceous particulate disposed in a resilient foam matrix.

2. The apparatus as defined in claim 1, wherein said electromagnetically absorbing layer includes an outwardly extending flange at the open end of said housing operable to be disposed between the peripheral edge of said housing and said vehicle window when said apparatus is positioned against said window.

3. The apparatus as defined in claim 1, further comprising means for securing said apparatus to said vehicle window.

4. A radar absorbing apparatus for absorbing radiation emitted from an electromagnetic radiation generating device mounted within an automotive vehicle, said apparatus comprising: a rigid housing having a closed end and an open end defining an inner cavity and an inner surface of said housing, said open end formed to have a peripheral edge dimensioned to mate to an interior surface of the vehicle's window, said housing having electromagnetically reflective properties; an electromagnetically absorbing layer disposed on the inner surface of said housing; and, an aperture through said closed end of said housing communicating with said cavity, said aperture dimensioned to receive an operative end of said electromagnetic radiation generating device.

5. The apparatus as defined in claim 4, wherein said housing has an electromagnetic shielding characteristic which provides at least about a −15 dB insertion loss.

6. The apparatus as defined in claim 4, wherein said apparatus provides a shielding effectiveness of at least about −40 dB.

7. The apparatus as defined in claim 4, wherein said housing is comprised of a polymeric material having conductive particulates dispersed therein.

8. The apparatus as defined in claim 7, wherein said polymeric material is thermoformable.

9. The apparatus as defined in claim 8, wherein said polymeric material is acrylonitrile-butadiene-styrene.

10. The apparatus as defined in claim 7, wherein said conductive particulates are stainless steel fibers.

11. The apparatus as defined in claim 7, wherein said conductive particulates have an aspect ratio of greater than about 5 to 1.

12. The apparatus as defined in claim 7, wherein said polymeric material is selected from the group consisting of polyethylene, polypropylene, polymethylmethacrylate, polystyrene, thermosets, and engineering thermoplastics.

13. The apparatus as defined in claim 4, wherein said electromagnetically absorbing layer is comprised of a foam loaded with a carbonaceous particulate.

14. An apparatus as defined in claim 4 further comprising means for attaching said apparatus to said vehicle window.

15. An apparatus as defined in claim 4, further comprising means for attaching said apparatus to said vehicle window, including: first and second strips of interlocking hook and loop fabric, said first strip, including adhesive means thereon for securing same to said vehicle window, and said second strip, being securely attached to said apparatus, for mating engagement with said first strip.

16. The apparatus as defined in claim 15, wherein said electromagnetically absorbing layer includes an outwardly extending flange at the open end of said housing operable to be disposed between the peripheral edge of said housing and said vehicle window when said apparatus is positioned against said window and said second strip is attached to said flange.

17. An apparatus as defined in claim 14, wherein said means for attaching is comprised of a thermally stable pressure sensitive adhesive on said apparatus positioned for engagement with said vehicle window.

18. An apparatus as defined in claim 14, wherein said means of attaching includes magnetic means on said apparatus attachable to a ferromagnetically active material on said vehicle window.

19. An apparatus as defined in claim 14, wherein said electromagnetically absorbing layer is a resilient foam and extends beyond said peripheral edge of said open end, and said attaching means causes said foam to be compressed against said window when said apparatus is attached thereto.

20. An apparatus as defined in claim 4, wherein said housing is comprised of a molded polymeric material having a layer of metal disposed along the inner surface thereof.

21. An apparatus as defined in claim 4, wherein said housing is comprised of a molded polymeric material having a layer of metal disposed along the outer surface thereof.

22. An apparatus as defined in claim 20, wherein said metallic layer is formed by vapor deposition.

23. An apparatus as defined in claim 4, wherein said housing is comprised of a molded polymeric material having a continuous metallic layer embedded therein.

* * * * *